United States Patent

[11] 3,623,649

[72] Inventor Wayne H. Keisling
Kokomo, Ind.
[21] Appl. No. 831,511
[22] Filed June 9, 1969
[45] Patented Nov. 30, 1971
[73] Assignee General Motors Corporation
Detroit, Mich.

[54] WEDGE BONDING TOOL FOR THE ATTACHMENT OF SEMICONDUCTOR LEADS
5 Claims, 8 Drawing Figs.

[52] U.S. Cl. .......... 228/15, 29/470.3, 29/497.5, 228/3, 29/591
[51] Int. Cl. .......... B23k 1/20
[50] Field of Search .......... 29/470, 470.1, 470.3, 497.5, 591, 47.1; 228/3, 4, 15, 16

[56] References Cited

UNITED STATES PATENTS

| | | | |
|---|---|---|---|
| 3,006,067 | 10/1961 | Anderson | 29/497.5 |
| 3,006,068 | 10/1961 | Anderson | 29/497.5 |
| 3,087,239 | 4/1963 | Clagett | 29/497.5 |
| 3,235,945 | 2/1966 | Hall | 29/470.1 |
| 3,250,452 | 5/1966 | Angelucci | 228/3 |
| 3,289,452 | 12/1966 | Kollner | 29/470.1 |
| 3,134,464 | 4/1967 | Avedissian | 29/470.1 |
| 3,357,090 | 12/1967 | Tiffany | 29/497.5 |
| 3,397,451 | 8/1968 | Avedissian | 228/3 |
| 3,430,835 | 3/1969 | Grable et al. | 29/591 |
| 3,472,244 | 3/1969 | Holzl | 228/3 |

*Primary Examiner*—John F. Campbell
*Assistant Examiner*—Donald P. Rooney
*Attorneys*—William S. Pettigrew and Robert J. Wallace

ABSTRACT: A bonding tool and method is disclosed for bonding the ends of a threadlike wire lead to two spaced-apart regions of a semiconductive device or other electronic article. One form of this invention includes a bonding tool having a tip for use with a reel of lead wire. The tip has an outwardly extending tapered groove on its working surface for producing an elongated wedge-shaped bond with the thinnest section of the wedge at the end of the bond adjacent to the reel. The unbonded wire adjacent the thinnest wedge section, extending from the source reel, is readily detached from the bonded portion with a light tug.

INVENTOR
Wayne H. Keisling
BY
Robert J. Wallace
ATTORNEY

WEDGE BONDING TOOL FOR THE ATTACHMENT OF SEMICONDUCTOR LEADS

This invention relates to bonding a length of a threadlike conductive lead between two spaced-apart regions of an article, and more particularly, between two spaced-apart regions of a semiconductive article such as a discrete semiconductive device, a hybrid thick film circuit, a monolithic circuit or the like.

In the manufacture of a hybrid thick film integrated circuit for example, it is commonly the practice to mount a semiconductive element on a nonconductive substrate having a conductive network printed on it. Threadlike wire lead connections are then made between contact regions on the semiconductive element and enlarged contact pads of the substrate conductors. These electrical connections are generally made by conventional and well known bonding techniques such as thermocompression and ultrasonic bonding.

One method customarily used to attach the threadlike wire leads is commonly known as "stitch" bonding. This technique uses a tubular bonding tool having a tapered capillary tip. The passageway through the tool terminates at the capillary tip, which forms the working end of the tool. The threadlike wire lead extends from a reel of wire through the tubular passageway out beyond the capillary tip. The end of the wire protruding from the tip is bent across the working end surface of the tool.

The protruding end of the wire is bonded by pressing it against a semiconductive element contact region with the bonding tip, while concurrently applying either heat or ultrasonic energy. The bonding tool is then raised from the semiconductive element contact region and moved to a substrate contact pad. During this movement wire from the reel is allowed to pass through the passageway in the tool to form the wire lead extending from the bonded end on the semiconductive element. As the tool is brought down onto the substrate contact pad, the extending wire bends across the working end surface of the bonding tip. The tool is then lowered to compress the bent portion of wire against the substrate contact pad. As before, heat or ultrasonic energy is concurrently applied to secure the bond.

The bonding tool is then retracted, again allowing the wire from the reel to pass through the tip. The newly extended wire is severed between the second bond and the bonding tip to complete the operation. In severing the wire, the segment left extending from the bonding tip is generally also bent across the face of the tip in preparation for the next bonding cycle.

In another version of wire bonding generally called "ball and stitch" bonding the end of the threadlike wire lead protruding from the bonding tip is shaped in the form of a ball. In "ball and stitch" bonding the protruding end of the wire lead is first fused by a jet of flame. The fused end is then allowed to solidify and as it does it beads in the form of a ball. The ball-shaped end of the source wire is then bonded to the contact region of the semiconductive element by applying heat or ultrasonic energy. After this first ball bond is made, the second bond is made as previously discussed above in "stitch" bonding. After the second bond is made the wire is severed by the jet of flame.

Although both "stitch" and "ball and stitch" bonding techniques produce satisfactory bonds, the wire lead extending from the second bond must be severed some distance from the bond to insure that the bond is not damaged by the severing device. This leaves a dangling loose wire or tag end with one end attached to a contact pad. Since this wire is generally longer than the spacing between other adjacent contact pads and conductors, it must be removed to prevent short circuiting.

The loose wire is usually removed by snipping it with a tweezerlike tool. This is an additional processing step which necessarily increases processing time. Furthermore, if the loose wire is not correctly removed the bond between the wire and its contact pad can be deleteriously weakened or even destroyed.

Accordingly, it is an object of this invention to provide an improved bonding tool for bonding a length of wire between two spaced-apart regions of an article.

It is another object of this invention to provide an improved bonding technique which inherently eliminates tag ends on wire interconnections.

Further objects and advantages of this invention will become apparent from a consideration of the following description, the appended claims and the accompanying drawings in which:

FIGS. 5 through 8 inclusively show a bonding tool of the invention in various stages of a "ball and stitch" bonding sequence.

Figure 1:
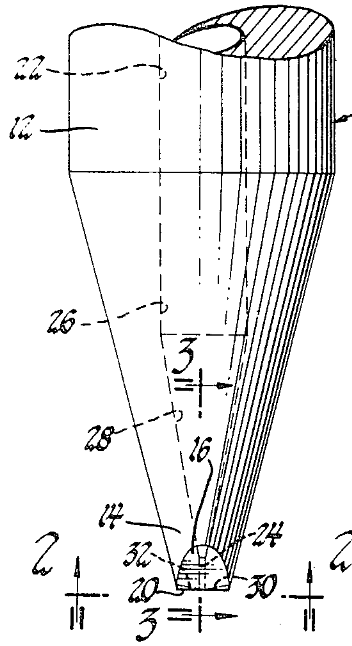
FIG. 1 is an elevational view of the bonding tool made in accordance with this invention.
Figure 2:
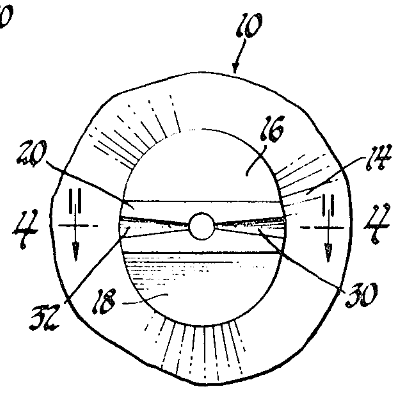
FIG. 2 is an end view of the bonding tool made in accordance with this invention.
Figure 3:
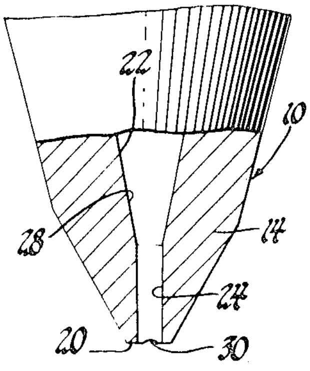
FIG. 3 is a fragmentary sectional view taken along line 3—3 of FIG. 1.
Figure 4:
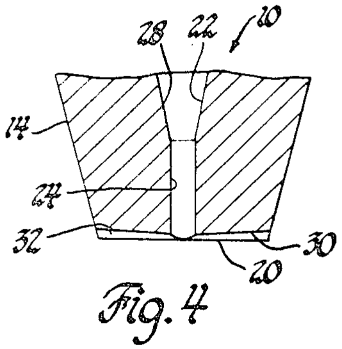
FIG. 4 is a fragmentary sectional view taken along line 4—4 of FIG. 2.

Referring now to the drawing, FIG. 1 shows an elongated bonding tool which is indicated generally by the numeral 10. This specific embodiment of tool 10 is generally designed for bonding a 1.5-mil wire lead. Tool 10 which includes a cylindrical section 12 and an essentially conical capillary tip 14 is adaptable to be used in any conventional and well known thermocompression or ultrasonic bonding apparatus (not shown). Capillary tip 14 has a pair of spaced-apart flatted surfaces 16 and 18 and an elongated working end surface 20 which is generally perpendicular to the longitudinal axis of bonding tool 10.

A passageway 22, which has circular cross section, extends from approximately the center of surface 20 axially through bonding tool 10. Passageway 20 includes a relatively narrow channel 24 which has a diameter of about 2 to 3 mils immediately adjacent surface 20. It further includes a relatively wide lead receiving channel 26 which is generally within cylindrical section 12. The diameter of channel 26 is about 30 mils. A funnel-shaped channel 28 smoothly connects channels 24 and 26 with each other.

A pair of oppositely disposed arcuately shaped tapered grooves 30 and 32 extend outwardly from passageway 22 toward the periphery of surface 20. Each of grooves 30 and 32 tapers substantially linearly from their greatest depth adjacent the periphery of surface 20 to their shallowest depth adjacent passageway 22. The radius of curvature of grooves 30 and 32 is essentially constant. Therefore their width tapers linearly in the same manner as does their depth.

A tool is generally designed for each lead size in that the dimensions of tapered grooves 30 and 32 are preferably related to lead diameter in the following manner. Specifically the length of tapered grooves 30 and 32 is preferably approximately 5 times lead diameter. The depth of grooves 30 and 32 is approximately 0.6 times lead diameter adjacent the periphery of surface 20 and 0.2 times lead diameter adjacent passageway 22. The radius of curvature of grooves 30 and 32 is approximately 0.6 times lead diameter.

Since, the herein disclosed preferred embodiment is designed for a lead diameter of approximately 1.5 mils, the length of groove 30 and 32 is approximately 0.00075 inch. Their depth is approximately 0.0009 inch adjacent the periphery of surface 20 and 0.0003 inch adjacent passageway 22 and their radius of curvature is about 0.0009 inch.

Other embodiments of bonding tool 10 have been used with success. Specifically, the dimensions of grooves 30 and 32 may be varied. However, it has been found that the length of each groove should be at least 3 times lead diameter. It has also been found that the depth of groove 30 and 32 can vary from about 1.0 times to 0.5 times lead diameter adjacent the periphery of surface 20. Their depth can vary from about 0.1 times to 0.5 times lead diameter adjacent passageway 22. It has been found however that the grooves should have at least some taper for optimum operability. Namely, it has been found that the depth of the grooves adjacent the periphery of surface 20 should exceed the depth adjacent passageway 22 by at least 0.1 times lead diameter. The radius of curvature of groove 30 and 32 can vary from about 0.5 times to about 1.0 lead diameter.

It should also be pointed out that although bonding tool 10 is herein described as having a pair of oppositely disposed grooves 30 and 32, bonding tool 10 would be operable with just one groove. It has been found however that bonding tool 10 can be orientated easier to make the second bond in a "ball and stitch" bonding sequence if there are at least two grooves. As will be described hereinafter, either of grooves 30 and 32 may be used to shape the wire lead.

Figure 5:
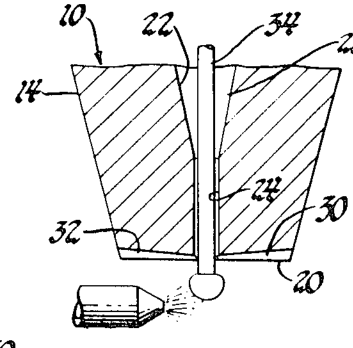

The operation of this improved bonding tool can be best described by referring to the FIGURES. As seen in FIG. 5 a gold wire lead 34 fed from a reel of wire (not shown) passes through passageway 22. An exposed end of lead 34 projects from surface 20. As seen in FIG. 5 this end is heated by a flame from a suitable source until the end melts and forms an integral bead. The flame is then removed and the beaded end solidifies in the form of a ball. The ball diameter for 1.5-mil wire lead is generally about 4 mils.

Figure 6:
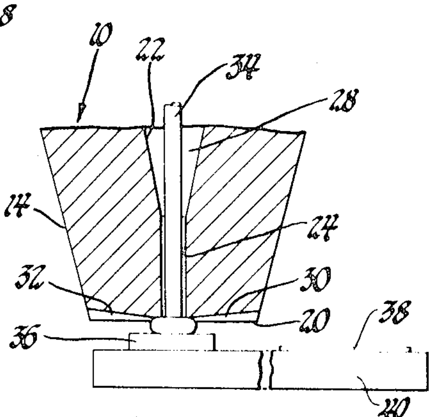
Figure 7:
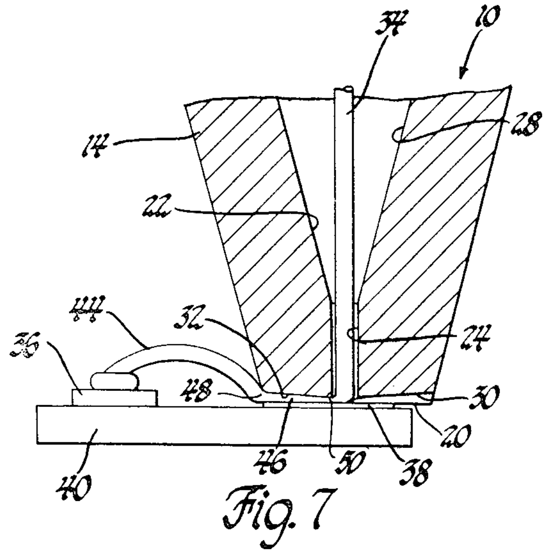

As seen in FIG. 6 two contact regions 36 and 38 are spaced apart on a nonconductive substrate 40. Contact region 36 is generally a semiconductive element having two or more active regions. Contact region 38 is generally an enlarged conductor pad affixed by conventional means to substrate 40. Capillary tip 14 forces the ball-shaped end of lead 34 into intimate contact with contact region 36. The ball-shaped end of lead 34 is then concurrently bonded to region 36 by the application of conventional ultrasonic bonding techniques. More specifically, bonding tool 10 is vibrated, by an ultrasonic transducer rapidly parallel to contact region 36 after intimate contact therewith. After this bond is made tool 10 is moved to a position directly above region 38 as is shown in FIG. 7. Wire lead 34 from the reel passes through passageway 22 during this movement. This forms an interconnecting lead loop 44. Bonding tool 10 is then rotated until one of the grooves 30 or 32 directly overlies the unbonded end or free end of loop 44.

Figure 8:
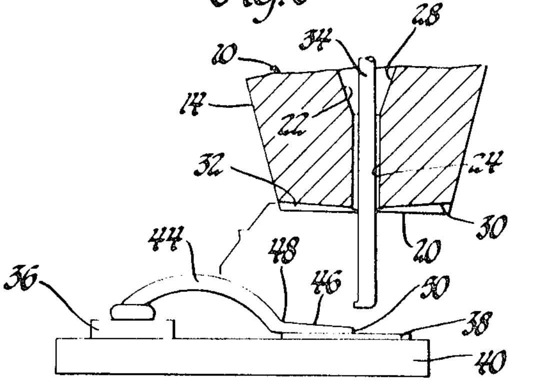

Part of loop 44 is then seated within one of the tapered grooves 30 or 32 as capillary tip 14 is moved into intimate contact with region 38. Loop 44 is then ultrasonically bonded to region 38 by rapidly vibrating tool 10 parallel to region 38. Concurrently, it is extruded generally within the confines of groove 30 or 32. A wedge-shaped bond 46 having an essentially linearly varying depth normal to region 38 is thus formed as is shown in FIGS. 7 and 8. The thickness of bond 46 varies from thick portion 48 adjacent loop 44 essentially linearly to thin portion 50 which has a thickness of about 60 percent and 20 percent respectively of the original lead diameter. Narrow segment 50 of bond 46 is adjacent the unbonded source wire lead 34 still contained in passageway 22.

Tool 10 is then moved away from bond 46 and additional amounts of lead 34 passes through passageway 22. When a sufficient amount of lead 34 is intermediate surface 20 and bond 46, a light pull on lead 34 separates it from bond 46 at thin portion 50. The end of lead 34 is then melted by a flame, as is shown in FIG. 5, and as it is allowed to cool it resolidifies in the form of a ball. The bonding operation may then be repeated.

It has been found that a wedged shaped bond having a thickness of about 20 percent of the original lead diameter at its thinnest portion gives optimum results. The unbonded source wire as herein described, for example, is easily separated from bond 46 by pulling the source wire. The separation takes place at thin segment 50 before bond 46 is deleteriously weakened. A bond having a thinner portion than 20 percent may result in bonding tool 10 engaging pad 38 at a point directly underlying bond 46. Any engagement would tend to damage pad 38. Furthermore, if the bonding process separated the bond from the source wire, lead 34 would not be pulled out of passageway 22 as bonding tool 10 is moved toward the next operation.

It should be appreciated that although this invention was described in regard to bonding wire leads to semiconductive devices, it is not to be so limited. Leads may be bonded to other preselected parts by using the hereindescribed inventive concepts.

It should also be appreciated that although the lead material was herein described as gold, other suitable conductive materials may be used, for example, aluminum and copper.

It should further be appreciated that although the herein-described embodiment utilized an arcuately shaped tapered groove to fashion wedge-shaped bond, other geometric shapes and forms may be employed utilizing the hereindescribed inventive concepts.

I claim:

1. A wire-bonding tool which comprises an elongated member having a working end surface, a lead-receiving passageway in said member extending to said working end surface, and at least one tapered groove in said end surface extending transversely from said passageway to the periphery of said working end surface, said tapered groove having a depth adjacent said periphery exceeding the depth of said groove adjacent said passageway.

2. The bonding tool as recited in claim 1 wherein the length of the tapered groove is at least about 3 times the lead diameter.

3. The bonding tool as recited in claim 2 wherein the shallowest depth of the tapered groove is at least about 0.1 times lead diameter to about 0.5 times lead diameter adjacent the passageway and the greatest depth of the tapered groove is less than lead diameter to about 0.5 times lead diameter adjacent the periphery.

4. The bonding tool as recited in claim 3 wherein the radius of curvature of the tapered groove is at least about 0.5 times lead diameter to about lead diameter.

5. A wire bonding tool which comprises an elongated member, an elongated working end surface on said member, a passageway extending longitudinally through said member to said end surface for guiding a wire lead onto said end surface, a pair of tapered grooves extending transversely from opposite sides of said passageway to the periphery of said end surface, said grooves having a length about 5 times the lead diameter, a depth approximately 0.6 times the lead diameter adjacent the periphery of said end surface and a depth of approximately 0.2 times the lead diameter adjacent said passageway and a radius of curvature approximately 0.6 times lead diameter for bonding the wire lead onto a preselected part.

* * * * *